United States Patent
Tanada et al.

(10) Patent No.: US 6,686,983 B2
(45) Date of Patent: Feb. 3, 2004

(54) REFLECTION TYPE LIQUID CRYSTAL DISPLAY DEVICE WITH HIGH-BRIGHTNESS BRIGHT DISPLAY AND HIGH CONTRAST

(75) Inventors: Tetsushi Tanada, Fukushima-ken (JP); Mitsuo Ohizumi, Fukushima-ken (JP); Mitsuru Kano, Fukushima-ken (JP)

(73) Assignee: Alps Electric, Co., Ltd., Tokyo (JP)

( * ) Notice: Subject to any disclaimer, the term of this patent is extended or adjusted under 35 U.S.C. 154(b) by 85 days.

(21) Appl. No.: 09/982,071

(22) Filed: Oct. 17, 2001

(65) Prior Publication Data

US 2002/0080311 A1 Jun. 27, 2002

(30) Foreign Application Priority Data

Oct. 24, 2000 (JP) ........................................ 2000-324493

(51) Int. Cl.[7] ............................................. G02F 1/1335
(52) U.S. Cl. ...................... 349/113; 349/117; 349/119
(58) Field of Search ................................ 349/113, 117, 349/119, 121, 118

(56) References Cited

U.S. PATENT DOCUMENTS 6,130,736 A   10/2000  Sasaki et al.
6,219,122 B1 *  4/2001  Uchida et al. .............. 349/117
6,429,920 B1 *  8/2002  Dohi .......................... 349/119

* cited by examiner

Primary Examiner—Carl Whitehead, Jr.
Assistant Examiner—Thanhha Pham
(74) Attorney, Agent, or Firm—Brinks Hofer Gilson & Lione

(57) ABSTRACT

A reflection type liquid crystal display device has phase difference plates and a polarizer provided on an outer side of a liquid crystal cell. The liquid crystal layer is twisted by 240 to 250 degrees with other characteristics including: $\Delta nd_{LC}$ for the crystal cell of 600 nm–800 nm, $\Delta nd_{RF1}$ for the first phase difference plate of 100 nm–200 nm, and the lagging axis $\gamma$ of 60 to 100 degrees, $\Delta nd_{RF2}$ for the second phase difference plate of 300 nm–500 nm and a lagging axis $\alpha$ of 90 to 140 degrees, and an absorption axis $\alpha$ of the polarizer of 20 to 70 degrees or 110 to 160 degrees.

3 Claims, 3 Drawing Sheets

REFLECTION TYPE LIQUID CRYSTAL DISPLAY DEVICE WITH HIGH-BRIGHTNESS BRIGHT DISPLAY AND HIGH CONTRAST

BACKGROUND OF THE INVENTION

1. Field of the Invention

The present invention relates to a reflection type liquid crystal display device which meets at least the performance requirements for a bright display with improved brightness and high contrast among the following performance requirements: a bright display with improved brightness and high contrast, a wide viewing angle in the vertical and horizontal directions on the display surface for excellent visual angle characteristics.

2. Description of Related Art

Generally speaking, liquid crystal display devices are classified into two types by display methods: a semi-transmission or transmission type with backlight and a reflection type. A reflection type liquid crystal display device is a liquid crystal display device which makes displays using only external light such as sunlight and illumination light without backlight. This type of liquid crystal display is widely used in devices which should be thin, lightweight and consume less power, such as personal digital assistants.

FIG. 5 is a sectional view which shows the general structure of a conventional typical reflection type liquid crystal display device. This is an example of a passive matrix STN liquid crystal display device.

This reflection type liquid crystal display device has a laminated structure consisting of a reflector 71 with a lower polarizer 70, a reflective mode STN (Super-Twisted Nematic) liquid cell 72 placed on top of the lowerpolarizer 70, a phase difference plate 73 placed on top of the cell 72 and an upper polarizer 74 placed on top of the plate 73.

The liquid crystal cell 72 generally comprises the following layers which are laminated in order from the lower polarizer 70 side: a lower glass substrate 75, a color filter 76, a lower transparent electrode layer 78, a lower alignment layer 79, an upper alignment layer 80 which is facing the lower alignment layer 79 with an STN liquid crystal layer 83 between the layers 79 and 80, an upper transparent electrode layer 81 and an upper glass substrate 82. There is an overcoat layer (not shown in the figure) of silica or acrylic resin between the color filter 76 and lower transparent electrode layer 78.

The above phase difference plate 73 compensates for phase difference in the light which passes through the STN liquid crystal to prevent the display from being bluish or yellowish.

Generally, the required display features of a liquid crystal display are excellence in the following aspects: (1) resolution, (2) contrast, (3) screen brightness, (4) color vividness, and (5) visibility (wide viewing angle, etc).

However, when a conventional reflection type liquid crystal display is used as the display of a personal digital assistant or similar device, on the display surface (screen), the area with good contrast in the horizontal direction is wide but the area with good contrast in the vertical direction is relatively narrow, which means high dependence on the viewing angle or poor visual angle characteristics. Also, the bright display (white display) is darker than in a transparent liquid crystal display with high luminance backlight.

One suggested approach as a solution to this problem is that the lower polarizer 70 located between the liquid crystal cell 72 and reflector 71 is omitted, namely only one polarizer (upper polarizer 74 located on the phase difference plate 73) is used to make the white display brighter at the time of application of selection voltage. However, in this type of reflection type liquid crystal display device, not only the bright display but also the dark display (black display) are brighter, causing a deterioration in contrast.

SUMMARY OF THE INVENTION

In view of the above circumstances, the present invention provides a reflection type liquid crystal display device which meets at least the performance requirements for improved brightness in the bright display (white display) and high contrast among the following performance requirements: improved brightness in the bright display and high contrast, wide viewing angles in the vertical and horizontal directions on the display surface for excellent visual angle characteristics.

To solve the above problem, the present invention provides a reflection type liquid crystal display which is characterized as follows. The reflection type liquid crystal display has a liquid crystal cell in which a transparent electrode and an alignment layer are provided on an inner side of one of two transparent substrates facing each other with a liquid crystal layer between them in the order of mention from the one substrate side while a transparent electrode and an alignment layer are provided on an inner side of the other transparent substrate in the order of mention from the other substrate side, and two phase difference plates and a polarizer which are provided on an outer side of the other transparent substrate in order from the other substrate side, wherein the liquid crystal layer is twisted by 240 to 250 degrees in its thickness direction and the crystal cell has a retardation ($\Delta nd_{LC}$) of 600 nm to 800 nm; and wherein, viewing the alignment direction a of the alignment layer on the other transparent substrate side and the alignment direction b of the alignment layer on the one transparent substrate from the light incidence side, when a direction of a normal X is assumed to be a direction which lies between the alignment directions a and b and passes through both the intersection O of the alignment directions a and b and a direction angled by one half of an interior angle formed by the alignment directions a and b, the retardation ($\Delta nd_{RF1}$) of the phase difference plate adjacent to the other transparent substrate is from 100 nm to 200 nm, and the lagging axis β of the phase difference plate forms an angle ($\phi_{RF2}$) of 60 to 100 degrees in the counterclockwise direction as viewed from the light incidence side with respect to the normal direction X, wherein the retardation ($\Delta nd_{RF2}$) of the phase difference plate adjacent to the polarizer is from 300 nm to 500 nm and the lagging axis γ of the phase difference plate forms an angle ($\phi_{RF2}$) of 90 to 140 degrees in the counterclockwise direction as viewed from the light incidence side with respect to the normal direction X, and wherein the angle ($\phi_{po1}$) formed by an absorption axis α of the polarizer with respect to the normal direction X is set at a value between 20 to 70 degrees or between 110 to 160 degrees in the counterclockwise direction from the light incidence side.

According to one aspect of the present invention, the reflection type liquid display device uses a single polarizer as it has a liquid crystal cell in which a transparent electrode and an alignment layer are provided on an inner side of one of two transparent substrates facing each other with a liquid crystal layer between them in the order of mention from the one substrate side while a transparent electrode and an alignment layer are provided on an inner side of the other transparent substrate in the order of mention from the other substrate side, and two phase difference plates and a polarizer which are provided on the outer side of the other transparent substrate in the order of mention from the other substrate side. With this structure, transmissivity is higher at the OFF time of voltage (when non-selection voltage is applied) and the bright display (white display) is brighter, which results in a higher contrast and excellent display characteristics.

Furthermore, the above liquid crystal layer is twisted by 240 degrees to 250 degrees in its thickness direction and the above crystal cell has a retardation ($\Delta nd_{LC}$) of 600 nm to 800 nm;

when, viewing the alignment direction a of the alignment layer on the other transparent substrate side and the alignment direction b of the alignment layer on the one transparent substrate from the light incidence side, a direction of a normal X is assumed to be a direction which lies between the alignment directions a and b and goes through both the intersection O of the alignment directions a and b and a direction angled by one half of an interior angle formed by the alignment directions a and b, the retardation ($\Delta nd_{RF1}$) of the phase difference plate adjacent to the other transparent substrate is from 100 nm to 200 nm, and the lagging axis $\beta$ of the phase difference plate forms an angle ($\phi_{RF1}$) of 60 to 100 degrees in the counterclockwise direction as viewed from the light incidence side with respect to the normal direction X;

the retardation ($\Delta nd_{RF2}$) of the phase difference plate adjacent to the polarizer is from 300 nm to 500 nm, and the lagging axis $\gamma$ of the phase difference plate forms an angle ($\phi_{RF2}$) of 90 to 140 degrees in the counterclockwise direction as viewed from the light incidence side with respect to the normal direction X; and the angle ($\phi_{po1}$) formed by an absorption axis $\alpha$ of the polarizer with respect to the normal direction X is set at a value between 20 to 70 degrees or between 110 to 160 degrees in the counterclockwise direction from the light incidence side so that the white display (bright display) is brighter, leading to a higher contrast.

According to another aspect of the present invention, in the reflection type liquid crystal display device as described above, the phase difference plate adjacent to the other transparent substrate has a coefficient $N_z$ of –0.5 to 2.0 as expressed by the equation (1) shown below and the phase difference plate adjacent to the polarizer has a coefficient $N_z$ of –0.5 to 2.0 as expressed by the equation (1) shown below. This is preferable because it is ensured that the area with good contrast in the horizontal and vertical directions on the display surface is wide, and thus the viewing angle in the horizontal and vertical directions on the display surface is wide, resulting in excellent visual angle characteristics.

$$N_z = (n_x - n_z)/(n_x - n_y) \quad \text{Equation (1)}$$

where $n_x$ denotes a refractive index in an X-axis direction of the phase difference plate, $n_y$ a refractive index in a Y-axis direction of the phase difference plate, and $n_z$ a refractive index in a Z-axis direction of the phase difference plate.

According to another aspect of the present invention, in the reflection type liquid crystal display device which has any of the above-described structures, when the chromatic dispersion for the birefringence ($\Delta n_{LC}$) of the liquid crystal constituting the liquid crystal layer is smaller than the chromatic dispersion for the birefringence ($\Delta n_{RF1}$) of the phase difference plate adjacent to the other transparent substrate and that for the birefringence ($\Delta n_{RF2}$) of the phase difference plate adjacent to the polarizer, the display provides higher contrast and excellent display characteristics.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Next, preferred embodiments of the present invention will be described in detail.

Figure 1:
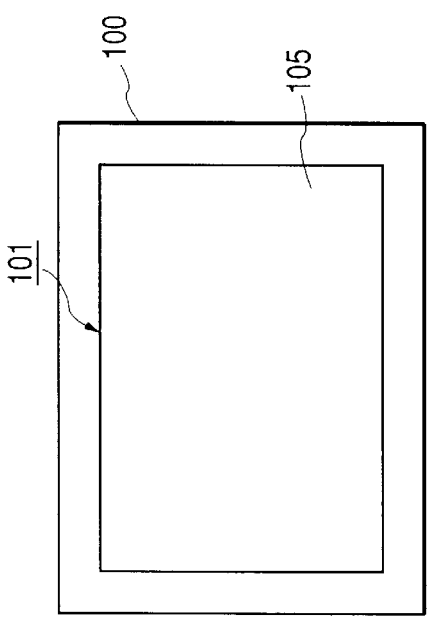
FIG. 1 is a front view of the display section of a personal digital assistant provided with a reflection type liquid crystal display device according to an embodiment of the present invention.

FIG. 1 is a front view of the display section of a personal digital assistant provided with a reflection type liquid crystal display device according to the first embodiment of the present invention as an STN reflection type color liquid crystal display device.

The display section of the personal digital assistant according to the first embodiment comprises at least a frame 100 and a reflection type liquid crystal display device 101 according to the first embodiment which is housed in the frame 100. This reflection type liquid crystal display device 101 according to the first embodiment is of the landscape-oriented type.

Figure 2:
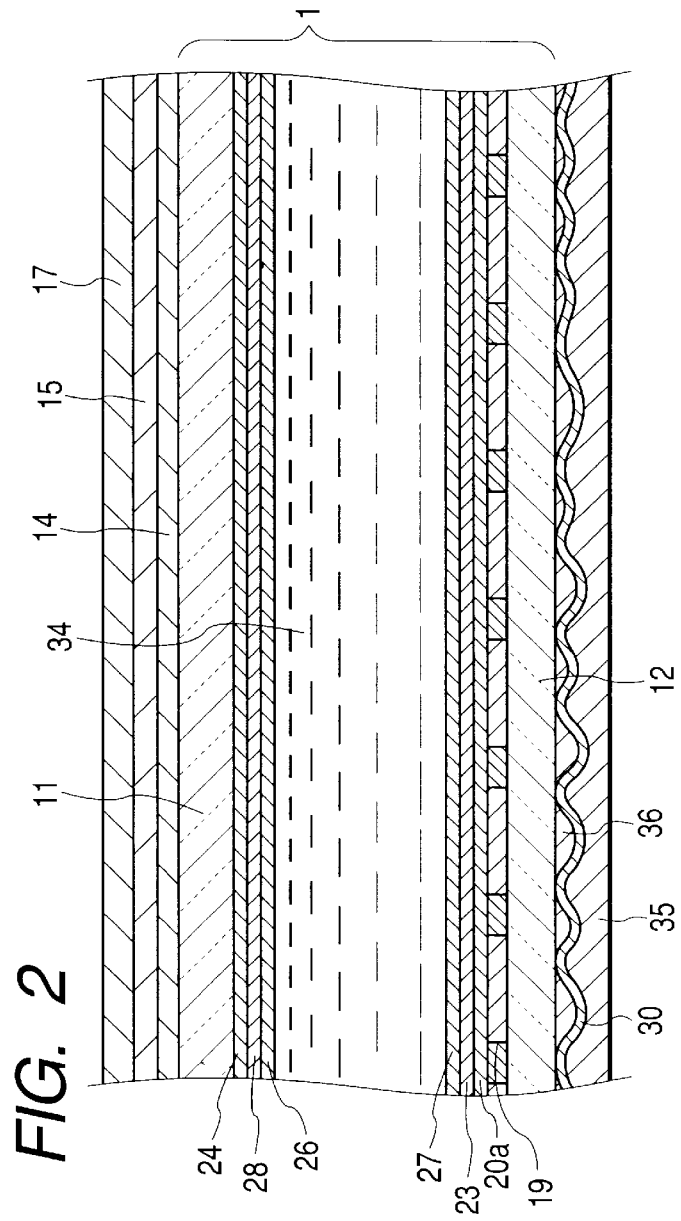
FIG. 2 is a sectional view showing an STN reflection type color liquid crystal display device as a reflection type liquid crystal display according to a first embodiment of the present invention.

As shown in FIG. 2, the reflection type liquid crystal display device 101 according to the first embodiment is mainly composed of the following: a liquid crystal cell 1; a first phase difference plate 14 (phase difference plate adjacent to the other transparent substrate), a second phase difference plate 15 (phase difference plate adjacent to a polarizer) and a polarizer 17 all of which are laminated on the outer side of an upper glass substrate 11 (the other transparent substrate) of the cell 1 in the order of mention from the upper glass substrate 11 side; and a reflector 30 which is located on the outer side of a lower glass substrate 12 (one transparent substrate) of the cell 1.

The liquid crystal cell 1 has a general structure that the upper glass substrate 11 and lower glass substrate 12 face each other with a liquid crystal layer 34 between them and, a color filter 19, a first overcoat 20a, a common electrode (transparent electrode) 23 and a lower alignment layer 27 (alignment layer on the one transparent substrate side) are laminated on the inner side of the lower glass substrate 12 in the order of mention from the lower glass substrate 12 side while a segment electrode 24 (transparent electrode), a top coat 28 and an upper alignment layer 26 (alignment layer on the other transparent substrate side) are laminated in the order of mention on the inner side of the upper glass substrate 11.

The upper and lower alignment layers 26 and 27 are commonly used transparent alignment layers such as rubbed membranes of polyimide or other polymer.

Figure 3:
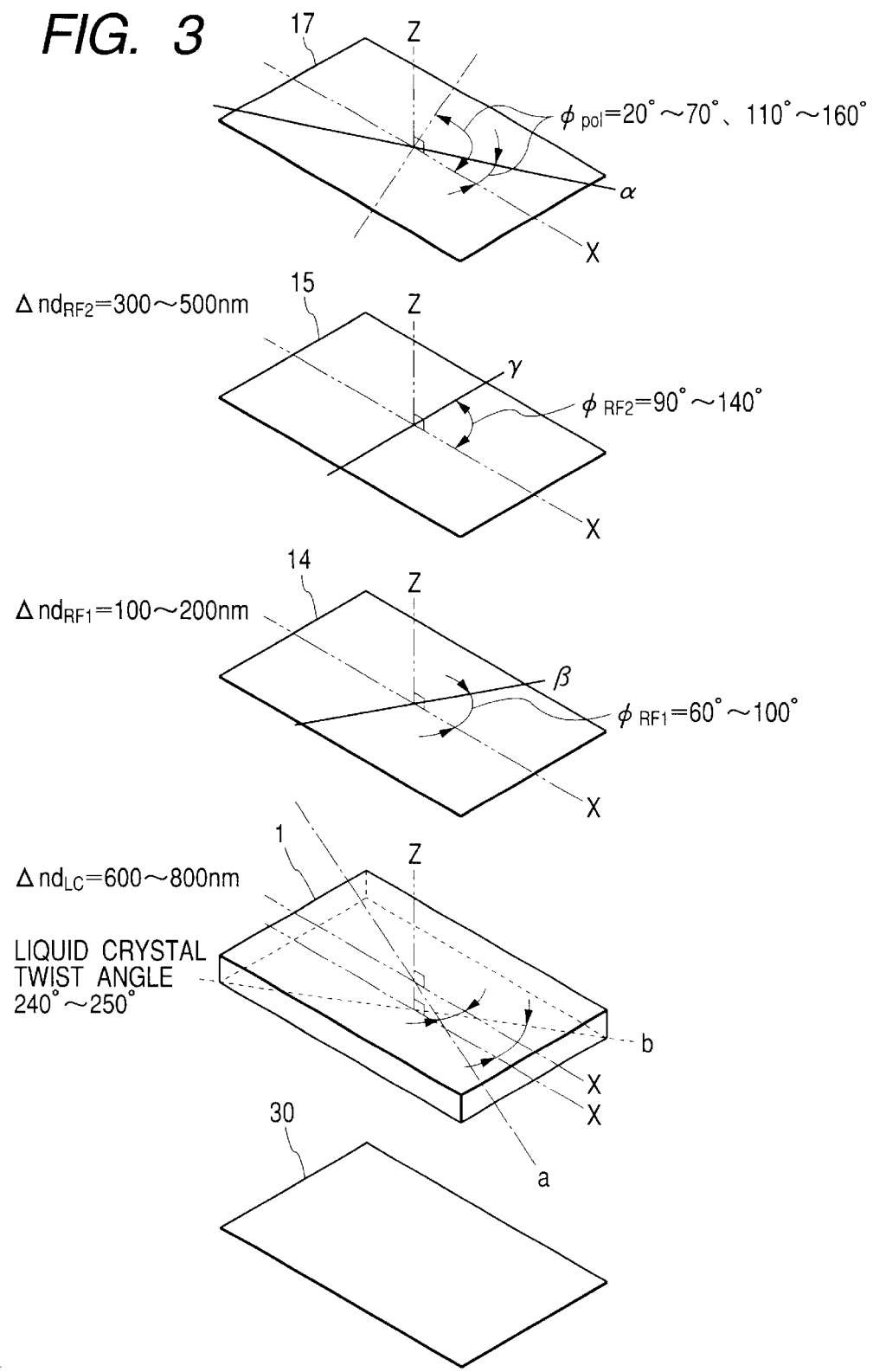
FIG. 3 is a perspective view showing disassembled main parts of the reflection type liquid crystal display according to the first embodiment of the present invention.
Figure 4:
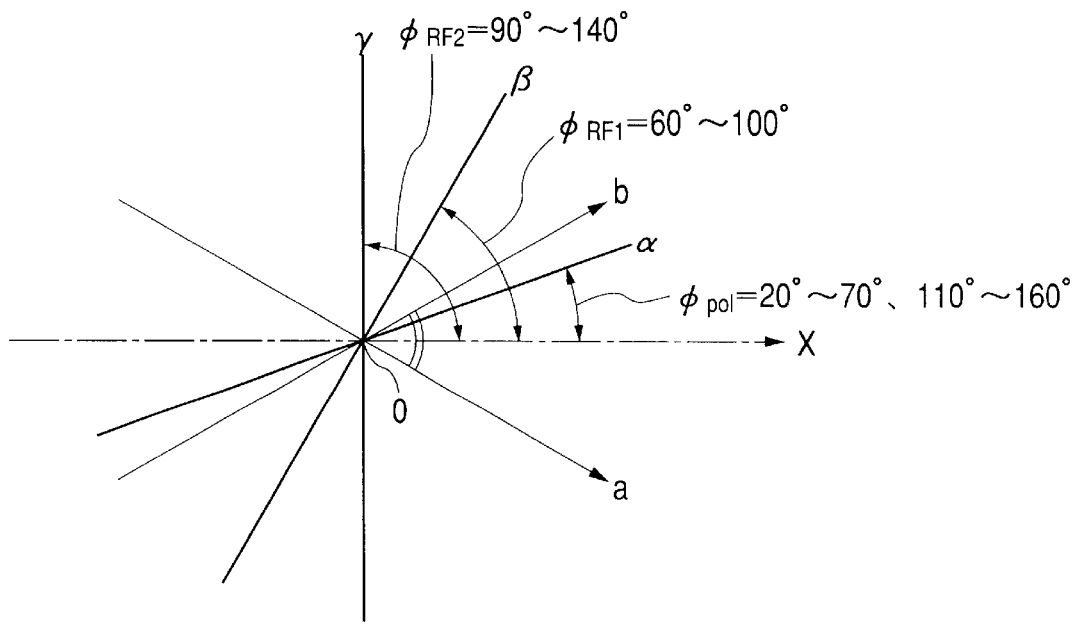
FIG. 4 is a top view showing the relationship among the absorption axis ($\alpha$) of the polarizer, the lagging axis $\beta$ of a first phase difference plate, the lagging axis $\gamma$ of a second phase difference plate, the alignment direction a of an upper alignment layer and the alignment direction b of a lower alignment layer in the reflection type liquid crystal display device according to the first embodiment of the present invention.
Figure 5:
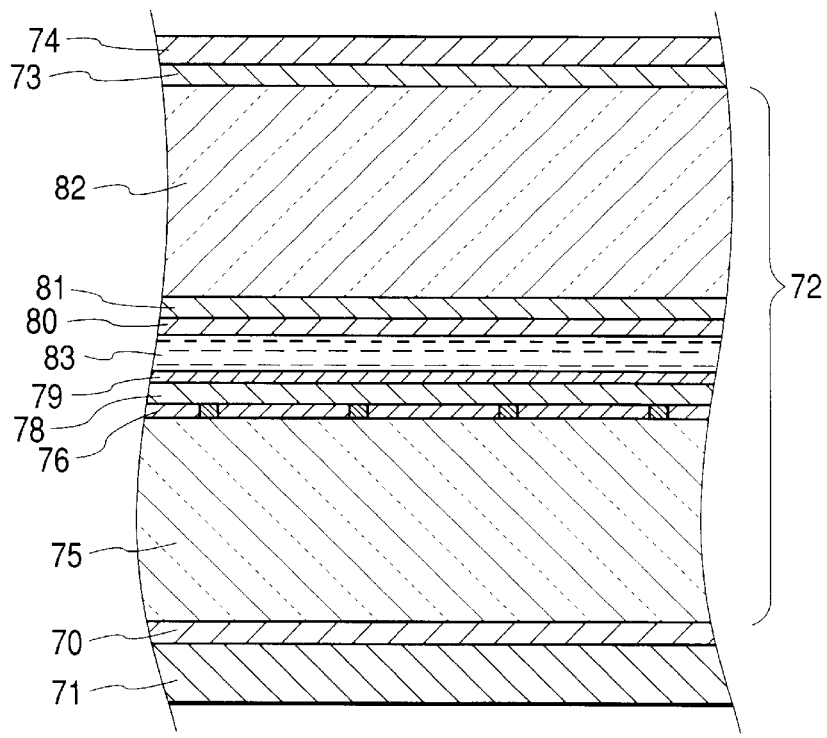
FIG. 5 is a sectional view showing the general structure of a conventional reflection type liquid crystal display device.

Assuming that the counterclockwise direction as viewed from the light incidence side is positive and the clockwise direction is negative as shown in FIGS. 3 and 4, according to this embodiment, the alignment direction (rubbing direction) a of the upper alignment layer 26 has an angle from −35 to −25 degrees, preferably −30 (+330) degrees.

Assuming that the counterclockwise direction as viewed from the light incidence side is positive and the clockwise direction is negative as shown in FIGS. 3 and 4, according to this embodiment, the alignment direction (rubbing direction) b of the lower alignment layer 27 has an angle from 25 to 35 degrees, preferably 30 degrees.

Here, as shown in FIG. 4, when viewed from the light incidence side, a direction which lies between the above alignment directions a and b and passes through both the intersection of the alignment directions a and b and the direction angled by one half of the interior angle formed by the alignment directions a and b is assumed to be the normal direction X.

In FIG. 3, Z represents a direction orthogonal to the light incidence side surfaces of the liquid crystal cell 1, first and second phase difference plates 14 and 15 and polarizer 17.

The liquid crystal 34 has a twisted structure with a twist angle of 240 to 250 degrees in its thickness direction (which means that the twist angle of the liquid crystal molecules constituting the liquid crystal layer 34 is from 240 to 250 degrees). It consists of liquid crystal molecules which become nematic at normal temperature when they are sealed up in an area which is surrounded by the upper and lower alignment layers 26 and 27 located respectively on the inner side of the upper and lower glass substrates 11 and 12 and sealant (not shown in the figure) joining the layers 26 and 27 with a prescribed space between them, where these liquid crystal molecules are of the STN (Super Twisted Nematic) type.

It is desirable to use liquid crystal as the liquid crystal layer 34 whose chromatic dispersion for the birefringence ($\Delta n_{LC}$) is smaller than the chromatic dispersion for the birefringence ($\Delta n_{RF1}$) of the first phase difference plate 14 and that for the birefringence ($\Delta n_{RF2}$) of the second phase difference plate 15 because a higher contrast and excellent display characteristics are assured. The chromatic dispersion for $\Delta n_{LC}$ of the liquid crystal as the liquid crystal layer 34 can be altered by changing the liquid crystal material. Also, the chromatic dispersion for $\Delta n_{RF1}$ or $\Delta n_{RF2}$ of the first phase difference plate 14 or the second phase difference plate 15 can be altered by changing the phase difference plate material.

The top coat 28 is intended to assure nonconductivity; it is made of an inorganic material such as silica or $ZrO_2$.

Although the material of the upper glass substrate 11 may vary depending on the type of liquid crystal display, in the case of this embodiment, it is made of soda lime glass or the like. The preferred thickness of the upper glass substrate 11 is from 0.3 to 1.1 mm, although it varies depending on the type of liquid crystal display.

The first overcoat 20a is intended to flatten the rugged surface of the color filter 19; it is made of an organic material such as polyvinyl alcohol or acrylic resin which well adheres to the color filter 19.

The color filter 19 is a filter on which pixels of three primary colors (red, blue and green) are formed in a desired pattern through photolithography or a printing process. The color filter 19 may have three primary color pixels which are outlined to form linear black matrix patterns, or neighboring pixels which partially overlap each other.

In the case of this embodiment, the lower glass substrate 12 (one transparent substrate) is made of soda lime glass containing sodium oxide or other alkali metal oxide, although it may vary depending on the type of liquid crystal display. It is preferable that the thickness of the lower glass substrate 12 is from 0.3 to 1.1 mm.

The reflector 30 is intended to reflect and diffuse incident light to increase the viewing angle.

In the reflection type liquid crystal display according to this first embodiment, the reflector 30 is a metal film such as an Al film or Ag film formed on the rugged surface of the glass substrate 35 located on the outer side of the lower glass substrate 12.

The reflector 30 is bonded to the lower glass substrate 12 through a transparent adhesive layer 36 made of an epoxy material containing fluorine.

The retardation value ($\Delta nd_{LC}$), namely the product of the birefringence ($\Delta n_{LC}$) of the above liquid crystal cell 1 and its thickness d, is set to a value between 600 nm and 800 nm (measurement wavelength 589 nm). If $\Delta nd_{LC}$ is out of the above range, the white display is darker, leading to deterioration in contrast.

It is preferable that the above value of $\Delta nd_{LC}$ is set to a value between 690 nm and 705 nm, more preferably 695 nm because such setting ensures a high contrast and satisfactory black and white displays.

The first and second phase difference plates 14 and 15 are polyvinyl alcohol or polycarbonate films which are stretched in one or two axis directions, where the stretching direction serves as the lagging direction.

$\Delta nd_{RF1}$ for the first phase difference plate 14 is set to a value between 100 nm and 200 nm (measurement wavelength 589 nm). If $\Delta nd_{RF1}$ is out of this range, a high contrast or bright white display cannot be achieved. It is preferable that the above value of $\Delta nd_{RF1}$ is between 160 nm and 180 nm. The lagging axis β of the first phase difference plate 14 is set at an angle ($\phi_{RF1}$) between 60 and 100 degrees in the counterclockwise direction as viewed from the light incidence side, with respect to the above normal direction X, as shown in FIGS. 3 and 4. If the lagging axis β is out of this range, a high contrast or bright white display cannot be achieved. More preferably, the lagging axis β's angle ($\phi_{RF1}$) in the counterclockwise direction as viewed from the light incidence side with respect to the normal direction X should be between 75 and 85 degrees in order to achieve a high contrast and satisfactory black and white displays.

$\Delta nd_{RF2}$ for the second phase difference plate 15 is set to a value between 300 nm and 500 nm (measurement wavelength 589 nm). If $\Delta nd_{RF2}$ is out of this range, a high contrast or bright white display cannot be achieved. It is preferable that the above value of $\Delta nd_{RF2}$ is between 370 nm and 400 nm. The lagging axis γ of the second phase difference plate 15 is set at an angle ($\phi_{RF2}$) between 90 and 140 degrees in the counterclockwise direction as viewed from the light incidence side, with respect to the normal direction X, as shown in FIGS. 3 and 4.

If the lagging axis γ is out of this range, a high contrast or bright white display cannot be achieved. More preferably, the lagging axis γ's angle ($\phi_{RF2}$) in the counterclockwise direction as viewed from the light incidence side with respect to the normal direction X should be between 110 and 130 degrees in order to achieve a high contrast and satisfactory black and white displays.

Preferably the $N_z$ coefficient as expressed by the above equation (1) for the first phase difference plate 14 should be between −0.5 and 2.0 and that for the second phase difference plate 15 should also be between −0.5 and 2.0 so that the good contrast area in the horizontal and vertical directions on a display surface 105 is wide and thus the viewing angle in the horizontal and vertical directions on the display surface 105 is wide, thereby assuring excellent visual angle characteristics.

The absorption axis (polarization axis) α of the polarizer 17 is set at an angle ($\phi_{PO1}$) between 20 and 70 degrees or between 110 and 160 degrees in the counterclockwise direction as viewed from the light incidence side, with respect to the normal direction X, as shown in FIGS. 3 and 4.

If the absorption axis a of the polarizer 17 is out of this range, a high contrast and satisfactory black and white displays cannot be achieved. More preferably, the absorption axis α's angle ($\phi_{PO1}$) in the counterclockwise direction as viewed from the light incidence side with respect to the normal direction X should be between 40 and 60 degrees or 130 and 150 degrees in order to achieve a high contrast and satisfactory black and white displays.

In the reflection type liquid crystal display according to this first embodiment of the present invention, only a single polarizer is used as described above so that the transmissivity is high during the OFF time of voltage (when non-selection voltage is applied) and thus the bright display (white display) is brighter, resulting in a higher contrast and excellent display characteristics.

Especially, in the reflection type liquid crystal display according to this first embodiment of the present invention, the liquid crystal layer 34 has a twisted structure with a twist angle of 240 to 250 degrees in its thickness direction; $\Delta nd_{LC}$ for the liquid crystal cell 1 is between 600 nm and 800 nm; $\Delta nd_{RF1}$ for the first phase difference plate 14 is between 100 nm and 200 nm and the lagging axis β of the phase difference plate 14 is set at an angle ($\phi_{RF1}$) between 60 and 100 degrees in the counterclockwise direction as viewed from the light incidence side with respect to the normal direction x; $\Delta nd_{RF2}$ for the second phase difference plate 15 is between 300 nm and 500 nm and the lagging axis γ of the phase difference plate 15 is set at an angle ($\phi_{RF2}$) between 90 and 140 degrees in the counterclockwise direction as viewed from the light incidence side with respect to the normal direction X; and the absorption axis α of the polarizer 17 is set at an angle ($\phi_{PO1}$) between 20 and 70 degrees or between 110 and 160 degrees in the counterclockwise direction as viewed from the light incidence side with respect to the normal direction X. This ensures a brighter white display (bright display) and a higher contrast.

In the reflection type liquid crystal display according to this first embodiment of the present invention, when the $N_z$ coefficient as expressed by the above equation (1) for the first phase difference plate 14 is between −0.5 and 2.0 and that for the second phase difference plate 15 is also between −0.5 and 2.0, the good contrast area in the horizontal and vertical directions on the display surface 105 is wide and thus the viewing angle in the horizontal and vertical directions on the display surface 105 is wide, thereby assuring excellent visual angle characteristics.

In the reflection type liquid crystal display according to the first embodiment of the present invention, when the chromatic dispersion for $\Delta n_{LC}$ of the liquid crystal constituting the liquid crystal layer 34 is smaller than the chromatic dispersion for $\Delta n_{RF1}$ of the first phase difference plate 14 and that for $\Delta n_{RF2}$ of the second phase difference plate 15, a higher contrast and excellent display characteristics can be achieved.

The explanation made so far is based on the assumption that the reflection type liquid crystal display according to the first embodiment of the present invention has a landscape-oriented display surface 105; however, the display surface 105 may also be portrait-oriented.

Also, it is assumed that there are a top coat 28 between the upper alignment layer 26 and segment electrode 24 and a first overcoat 20a between the common electrode 23 and color filter 19; however, the top coat 28 and the first overcoat 20a are not requisites and these should be provided as appropriate depending on the type of reflection type liquid crystal display and the required characteristics.

Although, in the abovementioned structure, the color filter 19 is located inside the liquid crystal cell 1, it is also acceptable that the color filter 19 is located outside the liquid crystal cell 1.

Furthermore, in the abovementioned structure, the reflector 30 is located outside the liquid crystal cell 1; however, it may be located inside the liquid crystal cell 1.

The alignment direction a of the upper alignment layer 26 and the alignment direction b of the lower alignment layer 27 are not limited to the abovementioned range; they should be appropriately set to suit the type of reflection type liquid crystal display or the required characteristics.

[EMBODIMENTS]

For better illustration of the present invention, embodiment samples and samples for comparison will be detailed next, although the present invention may be embodied in other specific forms.

(EMBODIMENT 1)

An examination was made about the display characteristics of a normally-white mode reflection type liquid crystal display which has virtually the same structure as shown in FIGS. 1 to 4.

For this embodiment, rubbing was done so as to realize a liquid crystal twist angle of 240 degrees, using PSI-2501 (trade name, made by CHISSO CORPORATION) for the upper and lower alignment layers in the liquid crystal cell. The alignment direction a of the upper alignment layer has an angle of +330 degrees (−30 degrees) in the counterclockwise direction as viewed from the light incidence side with respect to the normal direction X, while the alignment direction b of the lower alignment layer has an angle of +30 degrees in the counterclockwise direction as viewed from the light incidence side with respect to the normal direction X. As the liquid crystal material for the liquid crystal layer, AP-4268LA (trade name; made by Chisso Petrochemical Corporation) was used. In this case, the liquid crystal cell did not include a color filter.

NRZ-170 (trade name; made by Nitto Denko Col., Ltd.; polycarbonate) was used for the first phase difference plate, NRZ-430 (trade name; made by Nitto Denko Corporation; polycarbonate) for the second phase difference plate, and NPF-EG1225DU (trade name; made by Nitto Denko Col., Ltd.) for the polarizer.

Various embodiment samples (sample Nos. 1 to 10) were prepared as shown below in Table 1 where each sample has specific values for the following parameters: $\Delta nd_{LC}$ for the liquid crystal cell (measurement wavelength 589 nm); $\Delta nd_{RF1}$ for the first phase difference plate; the angle ($\phi_{RF1}$) of the first phase difference plate's lagging axis β with respect to the normal direction X; $\Delta nd_{RF2}$ for the second phase difference plate; the angle ($\phi_{RF2}$) of the second phase difference plate's lagging axis γ with respect to the normal direction X; and the angle ($\phi_{PO1}$) of the polarizer's absorption axis α with respect to the normal direction X.

In addition, for the purpose of comparison, samples Nos. 11 to 17 as shown below in Table 2 were prepared where their parameter values are out of the ranges as specified by the present invention regarding $\Delta nd_{LC}$ for the liquid crystal cell (measurement wavelength 589 nm); $\Delta nd_{RF1}$ for the first phase difference plate; the angle ($\phi_{RF1}$) of the first phase difference plate's lagging axis β with respect to the normal direction X; $\Delta nd_{RF2}$ for the second phase difference plate; the angle ($\phi_{RF2}$) of the second phase difference plate's lagging axis γ with respect to the normal direction X; and the angle ($\phi_{PO1}$) of the polarizer's absorption axis α with respect to the normal direction X.

The display characteristics of reflection type liquid crystal displays as samples Nos. 1 to 17 were examined under the following conditions. The light source, polarizer, second phase difference plate, first phase difference plate, liquid crystal cell and reflector were arranged in the order of mention; when light was incident upon the liquid crystal cell in the 180-degree azimuth direction with an angle of −30 degrees from the Z direction as shown in FIG. 3 or 4 and the reflected light was received with a 0-degree angle (the reflected light in the Z direction for the incident light from the Z direction with an angle of −30 degrees was received with a 0-degree angle), the brightness (Y) and contrast were evaluated during the white display state (application of 2.2 V) in the normally white mode (N/W). Here, the criterion for evaluation was as follows: if Y was larger than 40, the brightness was evaluated as satisfactory and if the contrast value was larger than 50, the contrast was evaluated as satisfactory.

TABLE 1

| Sample No. | Liquid crystal layer $\Delta nd_{LC}$ (nm) | First phase difference plate | | Second phase difference plate | | Polarizer | | |
|---|---|---|---|---|---|---|---|---|
| | | $\Delta nd_{RF1}$ (nm) | $\phi_{RF1}$ (°) | $\Delta nd_{RF2}$ (nm) | $\phi_{RF2}$ (°) | $\phi_{PO1}$ (°) | Y | Contrast |
| 1 | 630 | 175 | 80.0 | 330 | 122.0 | 62.0 | 40.71 | 77.2 |
| 2 | 650 | 175 | 80.0 | 330 | 122.0 | 62.0 | 43.03 | 219.8 |
| 3 | 670 | 175 | 80.0 | 340 | 120.0 | 54.0 | 44.71 | 53.2 |
| 4 | 700 | 131 | 68.0 | 377 | 99.0 | 24.5 | 43.78 | 93.5 |
| 5 | 720 | 140 | 70.0 | 410 | 100.0 | 25.0 | 46.44 | 111.3 |
| 6 | 720 | 160 | 80.0 | 370 | 114.0 | 40.0 | 47.31 | 51.0 |
| 7 | 720 | 180 | 90.0 | 330 | 130.0 | 65.0 | 47.17 | 59.2 |
| 8 | 740 | 170 | 85.0 | 370 | 124.0 | 53.0 | 46.66 | 57.3 |
| 9 | 760 | 170 | 75.0 | 450 | 105.0 | 34.0 | 47.10 | 64.4 |
| 10 | 780 | 170 | 75.0 | 450 | 105.0 | 34.0 | 44.07 | 86.6 |

TABLE 2

| Sample No. | Liquid crystal layer $\Delta nd_{LC}$ (nm) | First phase difference plate | | Second phase difference plate | | Polarizer | | |
|---|---|---|---|---|---|---|---|---|
| | | $\Delta nd_{RF1}$ (nm) | $\phi_{RF1}$ (°) | $\Delta nd_{RF2}$ (nm) | $\phi_{RF2}$ (°) | $\phi_{PO1}$ (°) | Y | Contrast |
| 11 | 580 | 175 | 80.0 | 330 | 122.0 | 62.0 | 41.2 | 8.3 |
| 12 | 630 | 210 | 80.0 | 330 | 122.0 | 62.0 | 38.4 | 9.1 |
| 13 | 630 | 175 | 55.0 | 330 | 122.0 | 62.0 | 46.3 | 1.8 |
| 14 | 630 | 175 | 80.0 | 290 | 122.0 | 62.0 | 31.0 | 32.4 |
| 15 | 630 | 175 | 80.0 | 330 | 145.0 | 62.0 | 43.5 | 1.2 |
| 16 | 630 | 175 | 80.0 | 330 | 122.0 | 15.0 | 47.4 | 1.6 |
| 17 | 630 | 175 | 80.0 | 330 | 122.0 | 75.0 | 44.2 | 5.5 |

As can be clearly seen from Tables 1 and 2, regarding $\Delta nd_{LC}$ for the liquid crystal cell (measurement wavelength 589 nm); $\Delta nd_{RF1}$ for the first phase difference plate; the angle ($\phi_{RF1}$) of the first phase difference plate's lagging axis β with respect to the normal direction X; $\Delta nd_{RF2}$ for the second phase difference plate; the angle ($\phi_{RF2}$) of the second phase difference plate's lagging axis γ with respect to the normal direction X; and the angle ($\phi_{RF2}$) of the polarizer's absorption axis α with respect to the normal direction X, some of these parameters for samples Nos. 11 to 17 for comparison were out of the ranges specified by the present invention; for example, their contrast values were below 33 and the white display Y values for some of these samples were below 39 (which means a relatively dark white display). By contrast, embodiment samples Nos. 1 to 10 according to the present invention had contrast values larger than 51 and had Y values over 40, which means a brighter white display. Particularly, samples 2 and 5 provide considerably a bright white display and high contrast values over 110. In short, the embodiment samples according to the present invention provide a brighter white display and a higher contrast than the samples for comparison, thereby assuring excellent display characteristics.

As discussed so far, according to one aspect of the present invention, the reflection type liquid display device uses a single polarizer as it has s liquid crystal cell in which a transparent electrode and an alignment layer are provided on the inner side of one of two transparent substrates facing each other with a liquid crystal layer between them in the order of mention from the one substrate side while a transparent electrode and an alignment layer are provided on the inner side of the other transparent substrate in the order of mention from the other substrate side, and two phase difference plates and a polarizer are provided on the outer side of the other transparent substrate in the order of mention from the other substrate side. With this structure, transmissivity is high in the OFF state of voltage (non-selection voltage is applied) and the bright display (white display) is brighter, resulting in a high contrast and excellent display characteristics.

Furthermore, the above liquid crystal layer is twisted by 240 to 250 degrees in its thickness direction; the above crystal cell has $\Delta nd_{LC}$ of 600 nm to 800 nm; $\Delta n\,d_{RF1}$ of the phase difference plate adjacent to the other transparent substrate is from 100 nm to 200 nm; the lagging axis β of the phase difference plate forms an angle ($\phi_{RF1}$) of 60 to 100 degrees in the counterclockwise direction as viewed from the light incidence side with respect to the normal direction X; $\Delta nd_{RF2}$ of the phase difference plate adjacent to the polarizer is from 300 nm to 500 nm; and the lagging axis γ of the phase difference plate forms an angle ($\phi_{RF2}$) of 90 to 140 degrees in the counterclockwise direction as viewed from the light incidence side with respect to the normal direction X; and the angle ($\phi_{pol}$) formed by the absorption axis α of the polarizer with respect to the normal direction X is set at a value from 20 to 70 degrees or from 110 to 160 degrees in the counterclockwise direction as viewed from the light incidence side so that a brighter white display (bright display) and a high contrast can be achieved.

In the reflection type liquid crystal display device as described above according to the present invention, the phase difference plate adjacent to the other transparent substrate has a coefficient $N_z$ of −0.5 to 2.0 as expressed by the equation (1) shown earlier and the phase difference plate adjacent to the polarizer has a coefficient $N_z$ of −0.5 to 2.0 as expressed by the equation (1) SO that the area with good contrast in the horizontal and vertical directions on the display surface is wide, and thus the viewing angle in the horizontal and vertical directions on the display surface is wide, resulting in excellent visual angle characteristics.

In the reflection type liquid crystal display device which has any of the above structures according to the present invention, when the chromatic dispersion for $\Delta n_{LC}$ of the liquid crystal constituting the liquid crystal layer is smaller than the chromatic dispersion for $\Delta n_{RF1}$ of the phase difference plate adjacent to the other transparent substrate and that for $\Delta n_{RF2}$ of the phase difference plate adjacent to the polarizer, a higher contrast and excellent display characteristics can be achieved.

What is claimed is:

1. A reflection type liquid crystal display device comprising a liquid crystal cell, the liquid crystal cell having first and second transparent substrates, a liquid crystal layer between the first and second transparent substrates, a first transparent electrode and a first alignment layer provided between the first transparent substrate and the liquid crystal layer, a second transparent electrode and a second alignment layer provided between the second transparent substrate and the liquid crystal layer, a first phase difference plate adjacent to the second transparent substrate, a second phase difference plate on the first phase difference plate, and a polarizer adjacent to the second phase difference plate, wherein the liquid crystal layer is twisted by 240 to 250 degrees in a thickness direction and the liquid crystal cell has a retardation ($\Delta nd_{LC}$) of 600 nm to 700 nm; and wherein, viewing from a light incidence side:
an alignment direction a of the second alignment layer, an alignment direction b of the first alignment layer, and a direction X bisects the alignment directions a and b, a retardation ($\Delta nd_{RF1}$) for the first phase difference plate is 100 nm to 200 nm and a lagging axis β of the first phase difference plate forms an angle ($\phi_{RF1}$) of 60 to 100 degrees in a counterclockwise direction with respect to the direction X;

wherein a retardation ($\Delta nd_{RF2}$) for the second phase difference plate is 300 nm to 500 nm and a lagging axis γ of the second phase difference plate forms an angle ($\phi_{RF2}$) of 90 to 140 degrees in the counterclockwise direction with respect to the direction X; and wherein an angle ($\phi_{pol}$) formed by an absorption axis α of the polarizer with respect to the direction X is between 20 and 70 degrees or between 110 and 160 degrees in the counterclockwise direction.

2. The reflection type liquid crystal display device according to claim 1, wherein the first and second phase difference plates each have a coefficient $N_z$ of −0.5 to 2.0 as expressed by the equation (1) shown below:

$$N_z = (n_x - n_z)/(n_x - n_y) \quad \ldots \quad \text{Equation (1)}$$

where $n_X$ denotes a refractive index in an X-axis direction of the phase difference plate, $n_y$ a refractive index in a Y-axis direction of the phase difference plates, and $n_Z$ a refractive index in a Z-axis direction of the phase difference plates.

3. The reflection type liquid crystal display device according to claim 1, wherein a chromatic dispersion for a birefringence ($\Delta n_{LC}$) of a liquid crystal constituting the liquid crystal layer is smaller than a chromatic dispersion for a birefringence ($\Delta n_{RF1}$) of the first phase difference plate and that for a birefringence ($\Delta n_{RF2}$) of the second phase difference plate.

* * * * *